United States Patent
Kim et al.

(10) Patent No.: US 10,183,256 B2
(45) Date of Patent: Jan. 22, 2019

(54) IN SITU REPAIRING TECHNIQUE FOR COMPROMISED POLYMERIC MEMBRANES

(71) Applicant: YALE UNIVERSITY, New Haven, CT (US)

(72) Inventors: Jaehong Kim, Madison, CT (US); Pyung-Kyu Park, Seoul (KR); Jae-Hyuk Kim, Busan (KR)

(73) Assignee: YALE UNIVERSITY, New Haven, CT (US)

( * ) Notice: Subject to any disclaimer, the term of this patent is extended or adjusted under 35 U.S.C. 154(b) by 0 days.

(21) Appl. No.: 14/730,405

(22) Filed: Jun. 4, 2015

(65) Prior Publication Data

US 2015/0352500 A1    Dec. 10, 2015

Related U.S. Application Data

(60) Provisional application No. 62/007,722, filed on Jun. 4, 2014.

(51) Int. Cl.
*B05D 3/00* (2006.01)
*B32B 43/00* (2006.01)
*B01D 65/10* (2006.01)
*B01D 67/00* (2006.01)

(52) U.S. Cl.
CPC ....... *B01D 65/108* (2013.01); *B01D 67/0088* (2013.01)

(58) Field of Classification Search
CPC . B01D 65/106; B01D 65/108; B01D 67/0088
USPC ........................................................ 427/140
See application file for complete search history.

(56) References Cited

U.S. PATENT DOCUMENTS

| | | | | |
|---|---|---|---|---|
| 5,006,187 A | * | 4/1991 | Cook | A41D 31/00 156/244.11 |
| 6,730,145 B1 | * | 5/2004 | Li | B01D 53/22 427/245 |
| 7,871,639 B2 | * | 1/2011 | Schankereli | A61K 9/0024 424/400 |
| 8,088,095 B2 | * | 1/2012 | Hissong | A61L 24/0015 424/488 |
| 2010/0087851 A1 | * | 4/2010 | Jones | A61K 38/012 606/213 |

OTHER PUBLICATIONS

Zaribaf et al; Toward in Situ Healing of Compromised Polymeric Membranes; Environmental Science & Technology Letters; 2014, 1, 113-116; Published: Oct. 7, 2013.*

Zaribaf, et al., "Toward in Situ Healing of Compromised Polymeric Membranes," Environ Sci Technol Lett. 2014. 1:113-116.

Huisman, et al., "Autopsy and failure analysis of ultrafiltration membranes from a waste-water treatment system," Desalination. 2004. 165:161-164.

(Continued)

*Primary Examiner* — Michael P Wieczorek
(74) *Attorney, Agent, or Firm* — Riverside Law LLP

(57) ABSTRACT

The invention provides compositions and methods for in situ repair of compromised polymeric membranes. The invention is useful for repairing compromised polymeric membranes without requiring the knowledge of damage location or the disassembly of a system. The invention relates to preferential blocking of damaged sites using agglomerates and subsequent cross-linking to form sturdy plugs.

19 Claims, 5 Drawing Sheets

(56) References Cited

OTHER PUBLICATIONS

Arkhangelsky, et al., "Hypochlorite Cleaning Causes Degradation of Polymer Membranes," Tribol Lett. 2007. 28:109-116.

Gijsbersten-Abrahamse, et al., "Fiber failure frequency and causes of hollow fiber integrity loss," Desalination. 2006. 194:251-258.

Oxtoby, "Experiences in integrity testing ultrafiltration membranes at a large potable water treatment works," Water Science and Technology: Water Supply. 2003. 3(5-6):1-7.

Krantz, et al., "An Integrity Sensor for assessing the performance of low pressure membrane modules in the water industry," Desalination. 2011. 283:117-122.

Walsh, et al., "Indirect integrity testing on a pilot-scale UF membrane," Journal of Water Supply: Research and Technology—AQUA. 2005. 54.2:105-114.

Deluhery, et al., "Use of paramagnetic particles in membrane integrity testing," Journal of Membrane Science. 2008. 318:176-181.

Johnson, "Automatic monitoring of membrane integrity in microfiltration systems," Desalination. 1997. 113:303-307.

Johnson, "Predicting Log Removal Performance of Membrane Systems Using In-Situ Integrity Testing," Membrane Testing: Filtration & Separation. 1998. 26-29.

Bennet, "Maintaining the integrity of filtration systems," Filtration+Separation. Jan./Feb. 2005. 30-33.

United States Environmental Protection Agency: Office of Water (4601), "Membrane Filtration Guidance Manual," EPA 815-R-06-009. i-E-8, Date: Nov. 2005.

Wickramasinghe, et al., "Relating the pore size distribution of ultrafiltration membranes to dextran rejection," Journal of Membrane Science. 2009. 340:1-8.

Farahbakhsh, et al., "Estimating air diffusion contribution to pressure decay during membrane integrity tests," Journal of Membrane Science. 2004. 237:203-212.

Causserand, et al., "Ageing of polysulfone membranes in contact with bleach solution: Role of radical oxidation and of some dissolved metal ions," Chemical Engineering and Processing: Process Intensification. 47(1):48-56, Date: Jan. 2008.

Guo, et al., "Low-pressure membrane integrity tests for drinking water treatment: A review," Water Research. 2010. 44:41-57.

Guo, et al., "Re-examination of cross-flow ultrafiltration for sampling aquatic colloids: evidence from molecular probes," Marine Chemistry. 2000. 69:75-90.

Li, et al., "Synthesis, Characterization, and Antibacterial Activity of Cross-Linked Chitosan-Glutaraldehyde," Mar Drugs. 2013. 11:1534-1552.

Mitra, et al., "Preparation and characterization of malonic acid cross-linked chitosan and collagen 3D scaffolds: an approach on non-covalent interactions," Journal of Materials Science. 2012. 23:1309-1321.

Pontié, "Effect of Aging on UF Membranes by a Streaming Potential SP Method," Journal of Membrane Science. Mar. 1999. 154:213-220.

Ramachandran, et al., "Formulation and Characterization of Glutaraldehyde Cross-Linked Chitosan Biodegradable Microspheres Loaded with Famotidine," Tropical Journal of Pharmaceutical Research. Jun. 2011. 10(3):309-316.

* cited by examiner

IN SITU REPAIRING TECHNIQUE FOR COMPROMISED POLYMERIC MEMBRANES

CROSS REFERENCE TO RELATED APPLICATIONS

The present application is entitled to priority to U.S. Provisional Application No. 62/007,722, filed Jun. 4, 2014, which is incorporated by reference herein in its entirety.

BACKGROUND OF THE INVENTION

The rapid growth of polymeric membrane processes, ultrafiltration in particular, in water and wastewater treatment sectors in the past several decades has largely been due to its superior reliability as an effective physical barrier against particulate and organic pollutants, disinfection byproduct precursors, and pathogens, compared to the reliability of conventional processes. This advantage holds as long as a membrane's integrity is preserved throughout its lifetime; damage to a membrane is prevalent in full-scale practices (Huisman I H et al., Desalination, 2004, 165:161-164). Membranes are compromised via several mechanisms, including but not limited to, aging of the membrane material, degradation by cleaning chemicals such as chlorine (Causserand et al., Chemical Engineering and Processing: Process Intensification, 2008, 47(1):48-56; Arkhangelsky E et al., Tribol Lett, 2007, 28(2):109-116), physical damage during operation and maintenance (e.g., air or water hammer) (Gijsbertsen-Abrahamse A J et al., Desalination, 2006, 194(1-3):251-258), damage by objects that are not removed by pretreatment (Guo H et al., Water Res, 2010, 44(1):41-57), fracturing due to high transmembrane pressure (Gijsbertsen-Abrahamse A J et al., Desalination, 2006, 194(1-3):251-258; Oxtoby S et al., Water Supply, 2003, 3(5-6):1-7), and breakage of hollow fibers. A compromised membrane results in the deterioration of product water quality and, if significant, system failure.

Unfortunately, there is a lack of technology that can properly address this problem; existing techniques focus mostly on detecting whether the membrane and its associated components such as module sealing have defects (Guo H et al., Water Res, 2010, 44(1):41-57; Krantz W B et al., Desalination, 2011, 283:117-122). Indirect techniques such as particle counting and turbidity monitoring assess the integrity during operation, but they are not preferred because of the low sensitivity (Walsh M E et al., J Water Supply: Res Technol-AQUA, 2005, 54(2):105-114; Cleveland D J et al., J MembrSci, 2008, 318(1-2):176-181). Pressure decay tests (PDTs) and diffusive air flow (DAF) tests are the most commonly used direct techniques because of their simplicity, reproducibility, and high sensitivity of damage detection (Guo H et al., Water Res, 2010, 44(1):41-57; Johnson W T, Desalination, 1997, 113(2-3):303-307; Johnson W T, Filtr Sep, 1998, 35(1):26-29; Bennett A, Filtr Sep, 2005, 41(1):30-33). When a failure in a membrane is suspected, however, the precise location of the damage must be identified before it can be repaired or replaced (Oxtoby S et al., Water Supply, 2003, 3(5-6):1-7). For example, damaged hollow fiber membranes can be isolated by manually sealing the fiber's open ends, although, in most cases, fiber failure requires replacement of the entire membrane module because it is difficult to locate broken fibers (Membrane filtration guidance manual; Office of Ground Water and Drinking Water, EPA: Cincinnati, Ohio, 2005). Repairing or replacing membranes requires equipment disassembly and significant loss of process run time.

There is a need for a method of repairing a damaged polymeric membrane without requiring the knowledge of damage location or the disassembly of a system. The present invention meets this need.

SUMMARY OF THE INVENTION

The present invention relates to compositions and methods for in situ repair of compromised polymeric membranes. The invention also relates to kits for in situ repair of compromised polymeric membranes.

In one aspect, the invention is a method of repairing a compromised region of a membrane. The method comprises the steps of contacting a membrane with a polymerizable agglomerate in solution, removing excess agglomerate from the membrane, and contacting the membrane with a cross-linking solution such that the agglomerate polymerizes to form a plug within the compromised region of the membrane.

In one embodiment, the agglomerate solution comprises chitosan. In various embodiments, the agglomerate in solution comprises a polymerizable material selected from the group consisting of: collagen, gelatin, hyaluronan, and fibrin. In various embodiments, the agglomerate in solution comprises agglomerates having a diameter between 0.1 µm to 1000 µm. In various embodiments, the agglomerate in solution comprises a concentration of agglomerates between 0.1 wt % and 90 wt %.

In one embodiment, the cross-linking solution comprises glutaraldehyde. In various embodiments, the cross-linking solution comprises a cross-linking agent selected from the group consisting of: formaldehyde, paraformaldehyde, acrolein, osmium tetroxide, and genipin. In various embodiments, the cross-linking solution comprises a concentration of cross-linking agent between 0.1 wt % and 90 wt %.

In various embodiments, contacting the membrane with solution further comprises filtering the solution under a pressure of at least 100 kPa. In various embodiments, contacting the membrane with solution further comprises stirring the solution at a rate of at least 100 rpm. In one embodiment, removing the excess agglomerate comprises washing the membrane with deionized water.

In one embodiment, the method further comprises the steps of drying the membrane and rinsing the membrane. In one embodiment, the membrane is dried for at least 1 hour at room temperature. In one embodiment, the membrane is rinsed with deionized water.

In another aspect, the invention relates to a kit for repairing compromised membranes. The kit comprises at least one agglomerate in solution, at least one cross-linking solution, and instructional material for performing the method of the invention. In one embodiment, the at least one agglomerate in solution comprises chitosan. In one embodiment, the at least one cross-linking solution comprises glutaraldehyde. In one embodiment, the at least one agglomerate in solution and the at least one cross-linking solution are in a concentrated form. In another embodiment, the at least one agglomerate in solution and the at least one cross-linking solution are in a lyophilized form. In another embodiment, the kit further comprises particles and solutes for testing the performance of a repaired membrane.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2, comprising

FIG. 3, comprising

DETAILED DESCRIPTION

Figure 1:
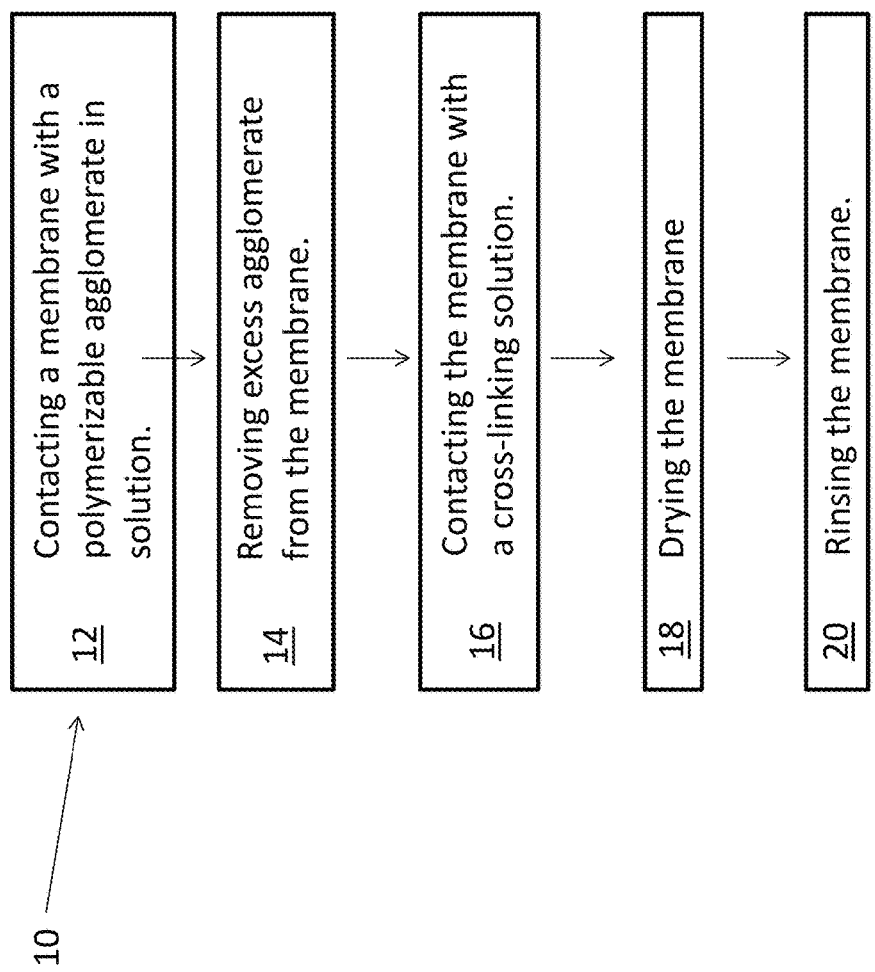
FIG. 1 is a flowchart illustrating an exemplary method for in situ repair of compromised polymeric membranes.

The present invention provides compositions and methods for in situ repair of compromised polymeric membranes. The invention is useful for repairing compromised polymeric membranes without requiring the knowledge of damage location or the disassembly of a system. The invention relates to preferential blocking of damaged sites using agglomerates and subsequent cross-linking to form sturdy plugs within the damaged or compromised regions of the membrane.

Definitions

It is to be understood that the figures and descriptions of the present invention have been simplified to illustrate elements that are relevant for a clear understanding of the present invention, while eliminating, for the purpose of clarity, many other elements found in typical methods of repairing membranes. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

As used herein, the term "agglomerates" refers to particles formed by agglomerating particles which typically have a smaller mean particle size than the formed agglomerates.

As used herein, the term "agglomeration" refers to processes for agglomerating particles including partially agglomerating particles to produce a particles having a greater average size and generally a broader particle size distribution.

As used herein, the term "cross-linking" refers to the formation of bonds between one polymer or portion of a polymer to another polymer or portion of a polymer. The adhesive polymers included in the primer layers of the invention are typically cross-linked by formation of a free radical intermediate.

As used herein, the process of passing a mixture through a filter is called "filtration".

As used herein, "membranes" are defined as porous bicontinuous structures, most commonly prepared by casting a polymer dispersion or solution into a desired shape, where the porous structure is formed by the so called "phase inversion" process. Those skilled in the art will readily recognize that phase inversion can be accomplished, for example, by inducing polymer precipitation in contact with gas phase, liquid phase, or by temperature. Nonlimiting examples of the desired shapes of the membrane include hollow fiber, flat sheet, or other articles. Fibrous materials, such as woven and non-woven fabrics or mats, usually have a discontinuous solid phase, which is formed by individual fibers entangled together.

As used herein, the term "polymer" refers to a compound that is a homopolymer or a copolymer. Homopolymers are typically prepared from a single monomer or oligomer. Copolymers are typically prepared from more than one monomers or oligomers.

"Repair", as used herein, refers to physically filling gaps or voids to restore a degree of structural integrity in an object.

As used herein, a "wt %" or "weight percent" or "percent by weight" of a component, unless specifically stated to the contrary, refers to the ratio of the weight of the component to the total weight of the composition in which the component is included, expressed as a percentage.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments therebetween. This applies regardless of the breadth of the range.

Compositions for In Situ Repair of Membranes

The present invention provides compositions in solution for in situ repair of compromised polymeric membranes. In various embodiments, the invention provides compositions of agglomerate solutions and cross-linking solutions for in situ repair of compromised polymeric membranes.

Accordingly, the invention includes compositions comprising agglomerate in solution. The agglomerate in solution comprises any material capable of being cross-linked. Non-limiting examples of materials that can form agglomerates of the present invention include, but are not limited to: chitosan, collagen, gelatin, hyaluronan, fibrin, and the like. The agglomerate in solution can comprise cross-linkable material in any suitable concentration. In one embodiment, the agglomerate in solution comprises at least 1 wt % cross-linkable material. In various embodiments, the concentration of cross-linkable material is between 0.1 wt % and 90 wt %. In another embodiment, the concentration of cross-linkable material is between 0.5% and 10 wt %. The cross-linkable material agglomerates can have any suitable diameter. In one embodiment, the agglomerates are at least 1 μm in diameter. In various embodiments, the agglomerates have diameters of between 0.1 μm and 1000 μm. The agglomerate in solution can further comprise any suitable solution. Non-limiting examples of solutions include acetic acid, hydrochloric acid, sodium chloride, phosphate, sodium borate, and the like. In one embodiment, the agglomerate in solution comprises one cross-linkable material. In another embodiment, the agglomerate in solution comprises multiple cross-linkable materials.

The invention also relates to compositions of cross-linking solutions. The cross-linking solution comprises any cross-linking agent in the art capable of cross-linking the agglomerates of the present invention. Non-limiting examples of cross-linking agents of the present invention include, but are not limited to: glutaraldehyde, formaldehyde, paraformaldehyde, acrolein, osmium tetroxide, genipin, and the like. The cross-linking solution can comprise cross-linking agents in any suitable concentration. In one embodiment, the cross-linking solution comprises at least 1 wt % cross-linking agent. In various embodiments, the concentration of cross-linking agent is between 0.1 wt % and 90 wt %. In another embodiment, the concentration of cross-linking agent is between 0.5 wt % and 10 wt %. The cross-linking solution can comprise any suitable solution. Non-limiting examples of solutions include water, phosphate buffered saline, carbonate buffer, dimethyl sulfoxide, and the like. In one embodiment, the cross-linking solution comprises one cross-linking agent. In another embodiment, the cross-linking solution comprises multiple cross-linking agents. In another embodiment, the cross-linking solution comprises multiple cross-linking agents if more than one agglomerates are used.

Methods of Repair

The invention provides methods for in situ repair of compromised polymeric membranes. In various embodiments, the invention relates to methods of preferential blocking of a damaged site using agglomerates and subsequent cross-linking to form sturdy plugs within the damaged or compromised regions of the membrane.

The invention is suitable for repairing any number of membrane damage types, including perforations, lacerations, microtears, abrasions, and the like. In one embodiment, the length of a site of damage can be as long as 2 mm. In one embodiment, the width of a site of damage can be as long as 100 μm. In various embodiments, the agglomerate in solution can be modified or customized to match the damage type. For instance, larger sites of damage may require a higher concentration of agglomerate in solution or larger agglomerate sizes.

Referring now to FIG. 1, a flowchart illustrating an exemplary method 10 of repairing compromised polymeric membranes in situ is depicted. Method 10 begins with step 12 of contacting the membrane with a polymerizable agglomerate in solution. Any suitable amount of agglomerate in solution may be used to contact the membrane. In one embodiment, the volume of solution used is at least 1 mL. In one embodiment, the amount of agglomerate in solution is at least 1 wt %. In various embodiments, the amount of agglomerate in solution is between 0.1 wt % and 90 wt %. In another embodiment, the amount of agglomerate in solution is between 0.5 wt % and 10 wt %. In one embodiment, the method of contact is by filtration. In some embodiments, the agglomerate in solution is filtered under pressure. The pressure of filtration can be any suitable pressure. In one embodiment, the filtration pressure is at least 100 kPa. In various embodiments, the filtration pressure is between 1 kPa to 10000 kPa. In some embodiments, the agglomerate solution is stirred during filtration. The stir rate can be any suitable stir rate. In one embodiment, the stir rate is at least 100 rpm. In various embodiments, the stir rate can be between 0 rpm and 1000 rpm.

In step 14, excess agglomerate is removed from the membrane. Preferably, excess agglomerate is removed from undamaged regions of the membrane, leaving primarily the agglomerates that have been deposited within damaged sites of the membrane. In one embodiment, the excess agglomerate solution is removed by rinsing. For example, the excess agglomerate solution may be removed by washing with deionized water.

In step 16, the membrane is contacted with a cross-linking solution, such as via filtering the cross-linking solution through the membrane. Any suitable amount of cross-linking solution may be used to contact the membrane. In one embodiment, the volume of cross-linking solution is at least 1 mL. In one embodiment, the amount of cross-linking agent in solution is at least 1 wt %. In various embodiments, the amount of cross-linking agent in solution is between 0.1 wt % and 90 wt %. In another embodiment, the amount of cross-linking agent in solution is between 0.5 wt % and 10 wt %. In one embodiment, the method of contact is by filtration. In some embodiments, the cross-linking solution is filtered under pressure. The pressure of filtration can be any suitable pressure. In one embodiment, the filtration pressure is at least 100 kPa. In various embodiments, the filtration pressure is between 10 kPa to 10000 kPa. In some embodiments, the cross-linking solution is stirred during filtration. The stir rate can be any suitable stir rate. In one embodiment, the stir rate is at least 100 rpm. In various embodiments, the stir rate can be between 0 rpm and 1000 rpm.

In step 18, the membrane may be optionally dried. The membrane can be dried using any method known in the art, such as air drying or heat treatment. The duration of drying can be any suitable time. In one embodiment, the drying duration is at least one hour. The temperature of drying can be any suitable temperature. In one embodiment, the drying temperature is room temperature.

In step 20, the membrane may be optionally subjected to a rinse step. The rinse step may be performed with any suitable rinsing agent. In one embodiment, the membrane is rinsed with deionized water.

The effectiveness of the repair may be tested by passing particles or solutes of various sizes through the membrane. The particles or solutes may be any particle or solute known in the art that the membrane is designed to reject but may leak through if the membrane is compromised. Non-limiting examples of particles or solutes include: quantum dots, dextran, polyethylene glycol, rhodamine, and the like.

The effectiveness of the repair may be measured by any method known in the art, such as by measuring water permeability or particle and solute rejection. In one embodiment, the effectiveness is measured by the percent of recovery. For example, an undamaged membrane may have a base percent of water permeability and particle and solute rejection. After damage, the membrane can be measured to have an increase in percent of water permeability and a decrease in percent of particle and solute rejection. After applying the repair method of the invention, an effective repair will be indicated by a decrease in post-damage water permeability and an increase in post-damage particle and solute rejection. In other words, the effectiveness of the repair can be measured by the percent of recovery calculated by the change in: undamaged to post-damage measurements difference versus post-damage to post-repair measurements. A completely effective repair will be indicated by a 100% recovery. A completely ineffective repair will be indicated by a 0% recovery.

The method of the invention is able to achieve at least 90% recovery, and may achieve up to a 100% recovery in membrane water permeability. The method of the invention is able to achieve at least 80% recovery, and may achieve up to a 100% recovery in particle and solute rejection.

In one embodiment, the steps of method 10 may be applied to a membrane multiple times. Repeating the steps of method 10 is useful to repair a membrane that has larger sized damage sites. Repeating the steps of method 10 is also useful to increase the effectiveness of the repair and to raise percent recovery. In various embodiment, method 10 may be repeated one time, two times, three times, four times, or five or more times.

Kits of the Invention

The invention also includes a kit comprising components useful within the methods of the invention and instructional material that describes, for instance, the method of repairing compromised polymeric membranes as described elsewhere herein. The kit may comprise components and materials useful for performing the methods of the invention. For instance, the kit may comprise premade agglomerate solutions and cross-linking solutions.

In one embodiment, the premade agglomerate solutions and cross-linking solutions are provided in concentrated form, such that the weight and size of the kit can be reduced and the solutions need only be diluted for immediate use. In another embodiment, the kit further comprises (preferably sterile) the components of the agglomerate solution and/or the cross-linking solution in lyophilized form. For instance, the components may be in premeasured amounts suitable for reconstitution and immediate use. The kit can further include one or more additional components, such as reconstitution containers, and additional reagents such as deionized water, wash buffer, and the like.

In one embodiment, the kit comprises test materials suitable for testing the effectiveness of the repair. For instance, the kit may include solutions comprising particles and solutes of various sizes, such as quantum dots, dextran, polyethylene glycol, rhodamine, and the like. The kit may include instructions for testing the membrane for properties such as water permeability and solute rejection using the various particles and solutes. The kit may include additional instructions to reapply the repair method if the test materials show an insufficient level of repair.

In certain embodiments, the kit comprises instructional material. Instructional material may include a publication, a recording, a diagram, or any other medium of expression which can be used to communicate the usefulness of the device or implant kit described herein. The instructional material of the kit of the invention may, for example, be affixed to a package which contains one or more instruments which may be necessary for the desired procedure. Alternatively, the instructional material may be shipped separately from the package, or may be accessible electronically via a communications network, such as the Internet.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: In Situ Repairing of Compromised Polymeric Membranes

Damage to membranes during operation and the consequential loss of process integrity are prevalent problems in membrane-based separation processes, particularly in water and wastewater treatment where ensuring product water quality is essential. Presented herein is an innovative method of repairing compromised polymeric membranes without requiring the knowledge of damage location or the disassembly of a system. This in situ repairing method involves preferential blocking of a damaged site using chitosan agglomerates and subsequent cross-linking with glutaraldehyde to form a sturdy plug. This study demonstrates that a sample ultrafiltration membrane with severe physical damage could recover its nearly original performance in terms of water permeability (96%) and solute/particle rejection (87-100%) by the repairing process.

The materials and methods employed in these experiments are now described.

Physical damage was first induced (Guo H et al., Water Res, 2010, 44(1):41-57; Pontié M, J MembrSci, 1999, 154(2):213-220) to a virgin regenerated cellulose (RC) 10 kDa ultrafiltration membrane (PLGC, Millipore) using a microtome blade (MX35 Premier+, Thermo Fisher Scientific). A scanning electron microscope (SEM, S-3700N™, Hitachi High Technologies) image in FIG. 2 obtained using a VP-SEM S-3700N™ instrument (Hitachi High Technologies) shows that the damage appears as a narrow slit with an approximate length of 2 mm and a width of 100 μm. These dimensions were fairly consistent within this study as a large number of samples were initially damaged but only a few were selected for further testing.

The first step of repair involved filtration of the chitosan agglomerate suspension through the damaged membrane. The chitosan suspension (1 wt %) was prepared by dissolving chitosan (15-25 kDa, Sigma-Aldrich) in a 1% acetic acid solution (Sigma-Aldrich), adjusting the pH to a desired level using NaOH (>97%, Sigma-Aldrich), and mixing the solution at 400 rpm for 10 min. The resulting suspension contained agglomerates at a number average size of ~2 μm according to dynamic light scattering analysis (Zetasizer Nano ZS, Malvern). The damaged membrane was installed in a dead-end filtration unit (effective filtration area of 4.1 cm$^2$, model 8010 stirred cell, Millipore), and 5 mL of the chitosan suspension (1 wt %) was filtered at 276 kPa while the mixture was being stirred at 400 rpm. In this step, chitosan agglomerates preferentially occupy the damaged site because of the greater hydraulic drag (higher permeation) through damaged sites. A brief washing of the membrane using deionized water after filtration removed most of the chitosans that might remain on the intact membrane surface.

Figures 2A, 2B, 2C:
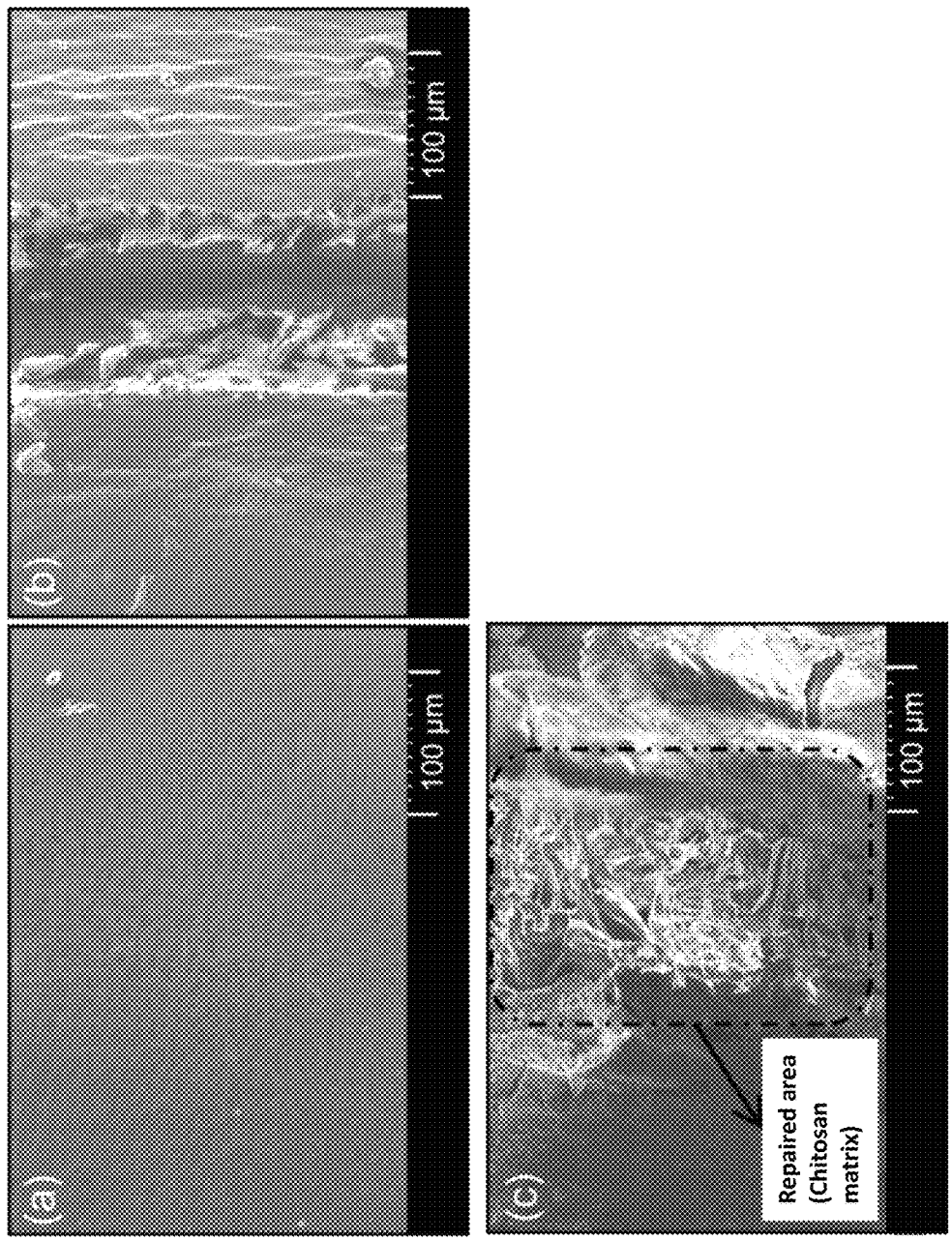
FIGS. 2A-2C, depicts SEM images of surfaces of (A) virgin, (B), damaged, and (C) repaired membranes.
Figures 3A, 3B:
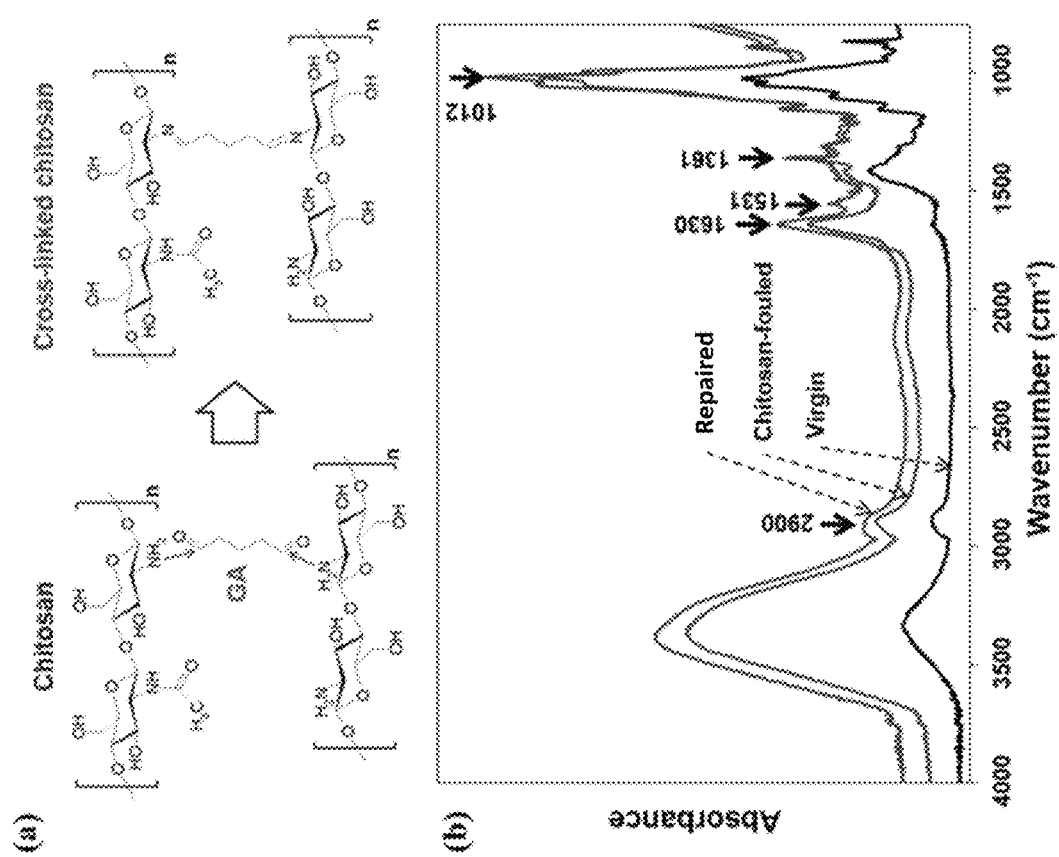
FIGS. 3A-3B, depicts (A) schematic illustrations of cross-linking between chitosan molecules with glutaraldehyde, and (B) ATR-FTIR spectra of virgin, chitosan-folded, and repaired membranes.

In the second step, chitosan agglomerates deposited in the damage sites form a polymerized network such that damaged sites are permanently plugged. This was achieved by filtering 2 mL of a 1 wt % glutaraldehyde solution (Sigma-Aldrich) at 138 kPa while the mixture was being stirred at 400 rpm, drying the membrane at room temperature for 1 h, and washing the deionized water. Cross-linking occurs as an imine (C=N) forms between the —CHO group of glutaraldehyde and the —NH$_2$ group of chitosan. Plugging of the damaged site was confirmed in the SEM image (FIG. 2C). FTIR-ATR (IRAffinity-1, Shimadzu) analysis confirmed the insertion of chitosan molecules (C=O at 1630 cm$^{-1}$ and C—N at 1361 cm$^{-1}$ (Mitra T et al., J Mater Sci: Mater Med, 2012, 23(5): 1309-1321)) onto the damaged site in both chitosan-loaded and glutaraldehyde-treated samples (FIG. 3), though formation of the C=N bond (C=N stretching at 1531 cm$^{-1}$ (Ramachandran S et al., Trop J Pharm Res, 2011, 10(3):309-316; Li B et al., Mar Drugs, 2013, 11(5):1534-1552)) was observed only in the repaired membrane.

The performance of virgin, compromised, and repaired membranes was evaluated on the basis of the water permeability and solute rejection at 138 kPa while the mixture was being stirred at 400 rpm and room temperature. Quantum dots (QD's) (15-20 nm, Life technologies), dextran (20 kDa, Sigma-Aldrich), polyethylene glycol (PEG) (10 kDa and 200 Da, Sigma-Aldrich), and rhodamine 6G (500 Da, 95% dye content, Sigma-Aldrich) were employed to represent particles and solutes of varying sizes (Guo L et al., Mar Chen, 2000, 69(1-2):75-90; Wickramasinghe S R et al., J MembrSci, 2009, 340(1-2):1-8). The concentrations of QD's, dextran, 10 kDa PEG, 200 Da PEG, and rhodamine 6G feed solutions were 80 nM, 0.1 wt %, 0.1 wt %, 0.01 wt %, and 1 wt %, respectively. The concentrations of the solutes were measured using a spectrofluorophotometer (RF-5031PC, Shimadzu) for QD's and rhodamine 6G and a total organic carbon (TOC) analyzer (TOC-VWP, Shimadzu) for dextran and PEG.

Figure 4:
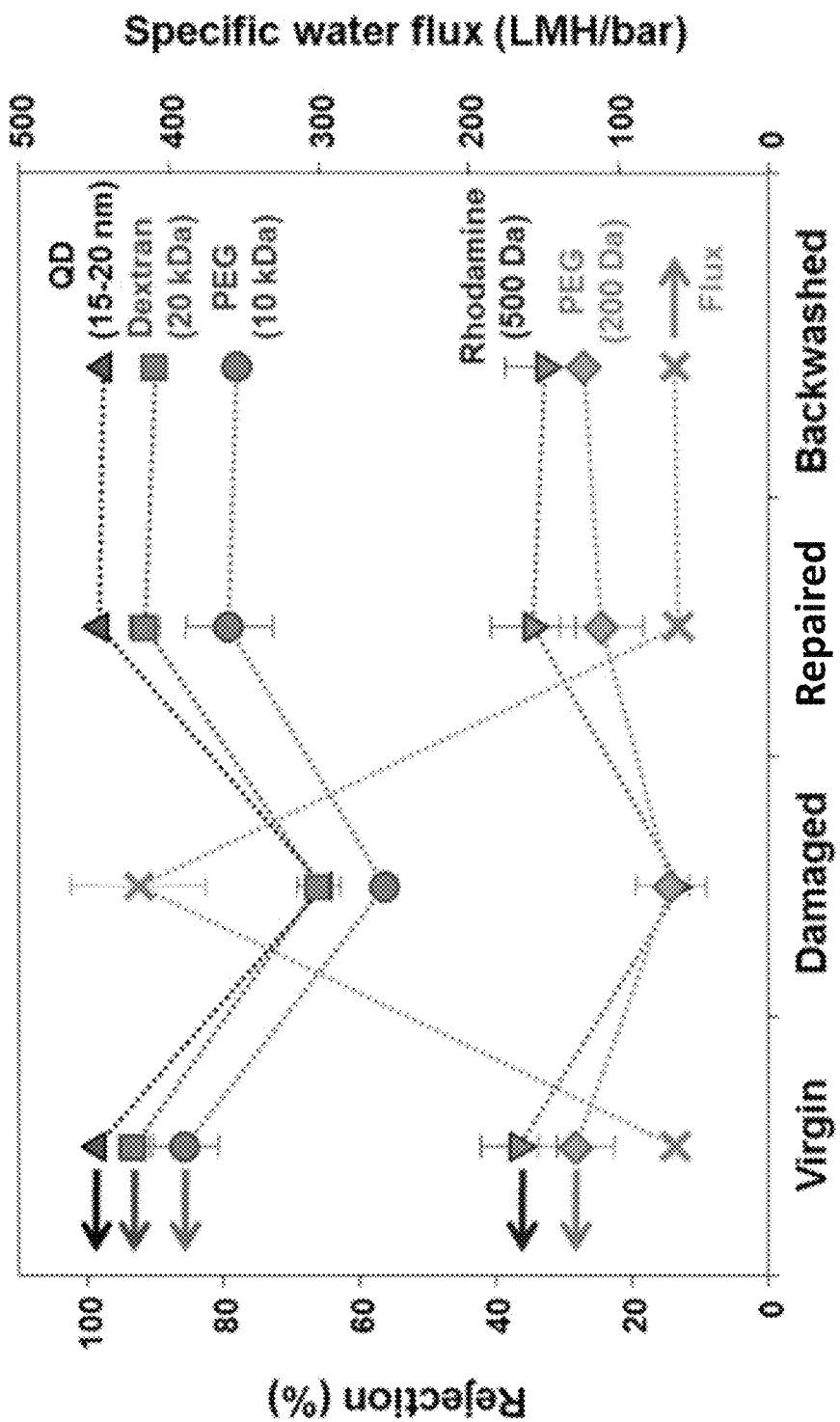
FIG. 4 depicts the results of experiments demonstrating water permeability and solute rejection of membranes before and after damaging, repairing, and backwashing. The average results from triplicate experiments are shown with the error bars denoting the variations in observations.

In situ repairing was found to nearly completely restore the membrane's original performance in terms of water permeability and solute rejection as shown in FIG. 4 The water permeability drastically increased from 61.7±2.0 LMH/bar (liters per square meter per hour per bar) for the virgin membrane to 420±45.2 LMH/bar for the compromised membrane. It is noteworthy that a small defect can increase the water permeability to such a large extent. After the repairing, water permeability recovered to 59.5±1.6 LMH/bar, corresponding to 96% of the virgin membrane's water permeability. This suggests the effective blocking of the damage site without adverse effects on membrane water permeability; i.e., a majority of chitosan agglomerates that were deposited on the undamaged surface were washed away during the repairing process. Note that the area of the damaged site was <0.12% of the total membrane area. Therefore, even complete blocking of the damaged opening would not cause a measurable decrease in flux. Steady-state rejection (i.e., rejection after the adsorption capacity of membrane had been exhausted) decreased by 29 to 49% depending on their molecular sizes after membrane damage. The rejections of QD's, for instance, were greater than 98% for virgin membranes but only 65% for the damaged membranes. The rejections of rhodamine 6G were 37 and 13% before and after damage, respectively. These results clearly demonstrated that even a very small rupture could severely compromise the integrity of membrane processes. After repairing, rejections were restored to 100, 98, and 93% for larger solutes, i.e. QD's, dextran, and 10 kDAPEG, respectively. The rejections of smaller solutes, i.e., rhodamine 6G and 200 Da PEG, were improved by 95% and 87%, respectively.

The cross-linked chitosan agglomerates that sealed the damaged sites appeared to be fairly firmly fixed such that they were not detached even when the repaired membrane was backwashed at 276 kPa for 1 min using deionized water (FIG. 4). Water permeability was maintained at 621±2.1 LMH/bar after the backwash, 4% higher than that before the backwash. The rejections after the backwash were 99.7, 98.3, 98.5, 94.7, and 110.3% of original rejections for QD's, dextran, 10 kDA PEG, rhodamine 6G, and 200 Da PEG, respectively. It should be noted that there was no covalent bonding between chitosan agglomerates and membrane material. Therefore, the relatively strong hold of chitosan agglomerates function as a filler that plugs irregularly shaped openings.

Figure 5:
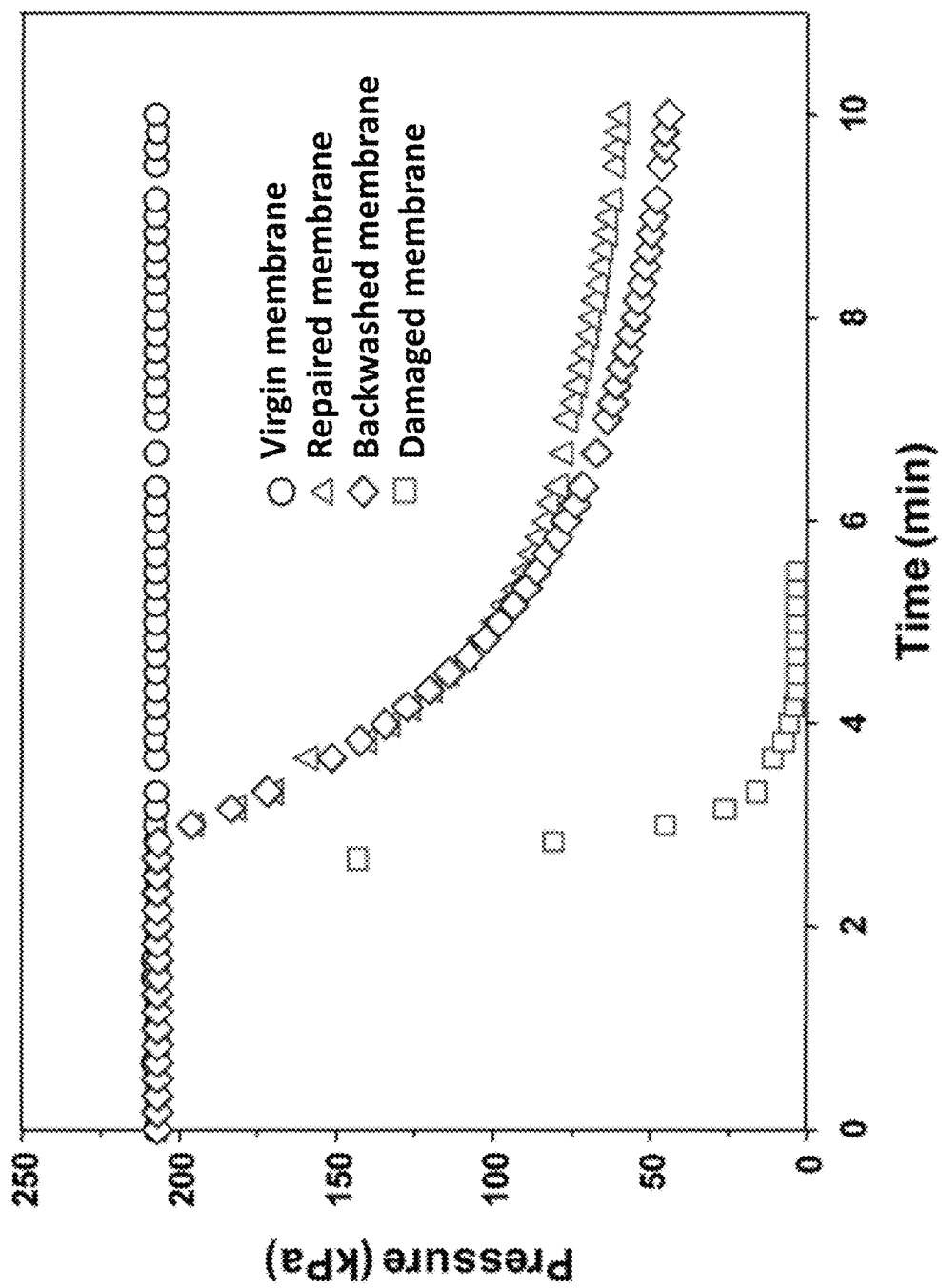
FIG. 5 depicts the results of experiments demonstrating pressure decay over time for different membranes.

Finally, the PDT, a method commonly employed to evaluate membrane integrity, was performed, and the results are shown in FIG. 5. Nitrogen gas at constant pressure of 207 kPa was applied for 3 min to the filtration cell that housed a wetted membrane. The supply of gas was then cut off, and the pressure inside the cell was monitored over time. The rates of pressure decay were 0, 49, 14, and 15 kPa/min for virgin, damaged, repaired, and backwashed membranes, respectively. The pressure decay rate recovered by 71% with the repairing process, and the effect of backwash on pressure decay was negligible. It should be noted that the pressure decay rate was not fully recovered by the repairing process, in contrast to the near complete recovery of particle/solute rejection. This resulted as nitrogen gas molecules could diffuse through the cross-linked chitosan matrix filled with water (e.g., void fractions between chitosan agglomerates) (Farahbakhsh K et al., J MembrSci, 2004, 237(1-2):203-212).

The results collectively demonstrate that the proposed in situ repairing process effectively restores the performance of the membrane even after significant physical damage has been introduced. This repairing process can be applied any time membrane integrity has been thought to be compromised or as a part of routine maintenance without disassembling the setup. These results can be extended to repair membranes with different configurations (e.g., hollow fibers), to repair a wide range of damage (e.g., size and shape) induced by different mechanisms in potentially different membranes (e.g., nanofiltration and reverse osmosis membranes), and to repair other types of system failure such as leaky O-rings.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of repairing a compromised region of a membrane, the method comprising the steps of:
   contacting a membrane with a polymerizable agglomerate in solution comprising chitosan;
   removing excess agglomerate from the membrane; and
   contacting the membrane with a cross-linking solution comprising glutaraldehyde, such that the agglomerate polymerizes to form a plug within the compromised region of the membrane.

2. The method of claim 1, wherein the agglomerate in solution comprises agglomerates having a diameter between 0.1 µm to 1000 µm.

3. The method of claim 2, wherein the diameter is about 2 µm.

4. The method of claim 1, wherein the agglomerate in solution comprises a concentration of agglomerates between 0.1 wt % to 90 wt %.

5. The method of claim 4, wherein the concentration is about 1 wt %.

6. The method of claim 1, wherein the cross-linking solution comprises a concentration of cross-linking agent between 0.1 wt % and 90 wt %.

7. The method of claim 6, wherein the concentration is about 1 wt %.

8. The method of claim 1, wherein contacting the membrane with at least one of the agglomerate in solution or the cross-linking solution further comprises filtering the solution under a pressure of at least 100 kPa.

9. The method of claim 8, wherein the pressure is between about 138 and 276 kPa.

10. The method of claim 1, wherein contacting the membrane with at least one of the agglomerate in solution or the cross-linking solution further comprises stirring the solution at a rate of at least 100 rpm.

11. The method of claim 10, wherein the stir rate is about 400 rpm.

12. The method of claim 1, wherein removing the excess agglomerate comprises washing the membrane with deionized water.

13. The method of claim 1, further comprising the steps of:
   drying the membrane; and
   rinsing the membrane.

14. The method of claim 13, wherein the membrane is dried for at least 1 hour at room temperature.

15. The method of claim 13, wherein the membrane is rinsed with deionized water.

16. The method of claim 1, wherein the agglomerate in solution is an acetic acid solution.

17. The method of claim 1, wherein the agglomerate in solution is pH-adjusted using NaOH.

18. The method of claim 1, wherein the steps are performed at room temperature.

19. The method of claim 1, wherein the method is configured to restore the membrane to at least 96% of its original water permeability rate.

* * * * *